A. A. PEHRSON.
CABLE INSULATION STRIPPER.
APPLICATION FILED DEC. 8, 1915.
1,187,386.
BEST AVAILABLE COPY
Patented June 13, 1916.
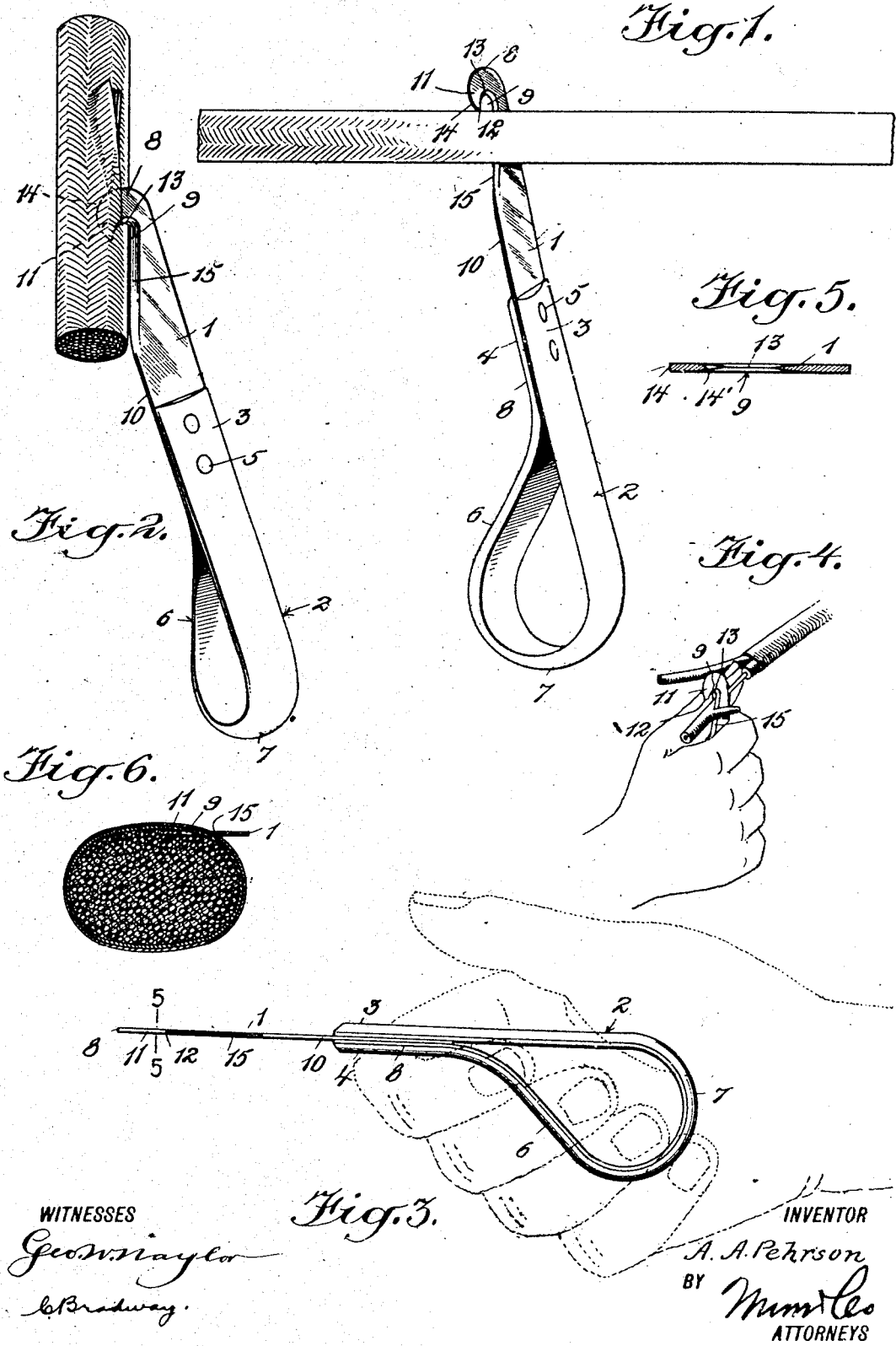
WITNESSES
Geo. W. Naylor
C. Bradway.
INVENTOR
A. A. Pehrson
BY Munn & Co
ATTORNEYS

# UNITED STATES PATENT OFFICE.

ALPHONSE A. PEHRSON, OF NEW YORK, N. Y.

CABLE-INSULATION STRIPPER.

1,187,386.

Specification of Letters Patent.　Patented June 13, 1916.

Application filed December 8, 1915.　Serial No. 65,715.

*To all whom it may concern:*

Be it known that I, ALPHONSE A. PEHRSON, a subject of the King of Sweden, and a resident of the city of New York, borough of Manhattan, in the county and State of New York, have invented a new and Improved Cable-Insulation Stripper, of which the following is a full, clear, and exact description.

This invention relates to an implement adapted to be used by electricians, linemen, telephone switch-board installers, and others, for the purpose of cutting the covering or insulation of a cable or circuit wire, and the invention has for its general objects to improve the construction of devices of this character so as to be reliable and efficient in use, easily manipulated, and so designed that the covering of a cable or wire can be easily and quickly cut without danger to the insulation on the individual wires or of the user cutting himself.

A further object of the invention is the provision of a stripper of the class described which has a novel blade and handle whereby the implement can be held in a convenient manner during the operation of making the entering incision in the insulation and cutting the insulation longitudinally of the wire for stripping the same, said blade having a cutting edge whereby the individual wires can be stripped of insulation.

With such objects in view, and others which will appear as the description proceeds, the invention comprises various novel features of construction and arrangement of parts which will be set forth with particularity in the following description and claims appended hereto.

In the accompanying drawings which illustrate one embodiment of the invention and wherein similar characters of reference indicate corresponding parts in all the views, Figure 1 is a perspective view of the implement in the position necessary for making the initial incision in the covering of a cable; Fig. 2 is a perspective view of the implement in the process of cutting the covering longitudinally; Fig. 3 is a side view of the tool showing the manner of gripping the same in the hand; Fig. 4 is a view showing the implement used for cutting the insulation off an individual wire after the covering of the cable has been removed; Fig. 5 is an enlarged sectional view of the blade taken on the line 5—5, Fig. 3; and Fig. 6 is an enlarged transverse section of a cable; showing the tangential relation of the blade when in a position for longitudinally cutting the covering of a cable.

Referring to the drawing, 1 designates the blade of the implement which is a piece of steel somewhat flexible, and attached to the blade is a handle 2. In the present instance the handle is shown as a strip formed into a loop, and the inner end of the blade is inserted between the ends 3 and 4 of the loop, and the parts are suitably secured together, as for instance, by rivets 5. The top member of the handle is approximately straight and extends in the same general direction as the blade 1, whereas the bottom member of the handle is curved so as to provide an inclined portion 6 which is adapted to be gripped by the base members of the fingers while the semi-circular portion 7 of the handle rests in the palm of the hand. The second joint of the first or index finger lies under the straight portion 8 of the handle. In this manner the implement is held in a natural position to enable the tool to be drawn longitudinally of the cable the cover of which is to be cut while the blade is approximately parallel to or in the same plane with the top surface of the cable where the cut in the covering is made.

The blade 1 has near its tip 8 a recess 9 which extends inwardly from the edge 10 so as to provide a bill 11 of a hook. This bill, which has a point 12, performs two functions, in that by means of the point the blade is easily inserted in the covering of a wire cable and it forms a guide which follows between the under side of the covering and the wires of the cable so as to guide the portion 13 of the cutting edge of the blade in such a manner that there is no danger of stripping the insulation from the individual wires. The cutting edge 13 does not extend to the point 12 and the latter is unsharpened so as not to cut the wires, and furthermore, the outer rounded edge 14 of the bill 11 is dull or unsharpened so that there is no danger of the operator cutting himself. As shown in Fig. 2, the point of the bill is considerably in front of the active portion of the cutting edge 13, and this figure, in connection with Fig. 6, clearly illustrates how the bill of the hook forms a guide between the covering of the cable and the wires.

In use the blade is parallel with the length of the cable and tangential thereto and the oblique edge 15 of the recess 9 is also parallel with the cable. This is a natural position in which the tool aligns itself while the handle is gripped as shown in Fig. 3, and a pull is exerted in a direction longitudinally of the cable. If desired the oblique edge 15 of the blade may be sharpened so that the tool will have an additional use for removing the insulation from individual wires, as shown in Fig. 4, like an ordinary pen knife. In Fig. 5, the fact that the bill 11 of the blade has its opposite edges unsharpened is clearly brought out at 14 and 14'.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An insulation stripping implement comprising a flat, knife blade having a sharpened edge and provided with a hook at the tip of the blade, which hook is flat and lies in the same plane with the latter, the inner edge of the hook being sharpened from the sharpened edge of the blade to a point short of the bill of the hook, and said bill being disposed at the same side of the blade as the sharpened edge thereof, and a handle connected with the blade and having its length at an oblique angle to the sharpened edge of the blade.

2. An insulation stripping implement comprising a flat, knife blade having a sharpened edge and provided with a hook at the tip of the blade, which hook is flat and lies in the same plane with the latter, the inner edge of the hook being sharpened from the sharpened edge of the blade to a point short of the bill of the hook, and said bill being disposed at the same side of the blade as the sharpened edge thereof, and a handle connected with the blade and having its length at an oblique angle to the sharpened edge of the blade, said handle being flat at its top and curved into a gripping portion at its bottom, whereby the major part of the handle lies to one side of the plane of the blade to rest in the palm of the closed hand while the forefinger and thumb grip the implement at opposite sides adjacent the inner end of the handle.

In testimony whereof I have signed my name to this specification in the presence of two subscribing witnesses.

ALPHONSE A. PEHRSON.

Witnesses:
C. BRADWAY,
G. H. EMSLIE.